(12) United States Patent
Itakura et al.

(10) Patent No.: US 11,846,842 B2
(45) Date of Patent: Dec. 19, 2023

(54) DISPLAY DEVICE

(71) Applicant: Japan Display Inc., Tokyo (JP)

(72) Inventors: Shimon Itakura, Tokyo (JP); Yuzo Ota, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/295,265

(22) Filed: Apr. 4, 2023

(65) Prior Publication Data
US 2023/0314857 A1  Oct. 5, 2023

(30) Foreign Application Priority Data

Apr. 5, 2022 (JP) .................................. 2022-063014

(51) Int. Cl.
| | | |
|---|---|---|
| *G02F 1/1333* | (2006.01) | |
| *G02F 1/1347* | (2006.01) | |
| *G02F 1/1335* | (2006.01) | |
| *G02F 1/13357* | (2006.01) | |

(52) U.S. Cl.
CPC ...... *G02F 1/133368* (2021.01); *G02F 1/1347* (2013.01); *G02F 1/133528* (2013.01); *G02F 1/133608* (2013.01); *G02F 2202/28* (2013.01); *G02F 2203/48* (2013.01)

(58) Field of Classification Search
CPC ......... G02F 1/133368; G02F 1/133528; G02F 1/133608; G02F 1/1347; G02F 2203/48
USPC ...................................... 349/74–75
See application file for complete search history.

(56) References Cited

U.S. PATENT DOCUMENTS 6,643,224 B1 * 11/2003 Sekiguchi ............ G04G 9/0035
368/242
2009/0109351 A1   4/2009 Shiomi

FOREIGN PATENT DOCUMENTS

WO    2007/108183 A1    9/2007

* cited by examiner

*Primary Examiner* — Charles S Chang
(74) *Attorney, Agent, or Firm* — XSENSUS LLP

(57) ABSTRACT

According to one embodiment, a display device includes a liquid crystal display panel including a first substrate having a first length and a second substrate having a second length, a dimming panel including a third substrate having a third length and a fourth substrate having a fourth length, wherein the third length is greater than the first length, the second length and the fourth length, the first length is greater than the second length, the third thickness of the third substrate is greater than the first thickness of the first substrate, and the second thickness of the second substrate is greater than the first thickness.

9 Claims, 6 Drawing Sheets

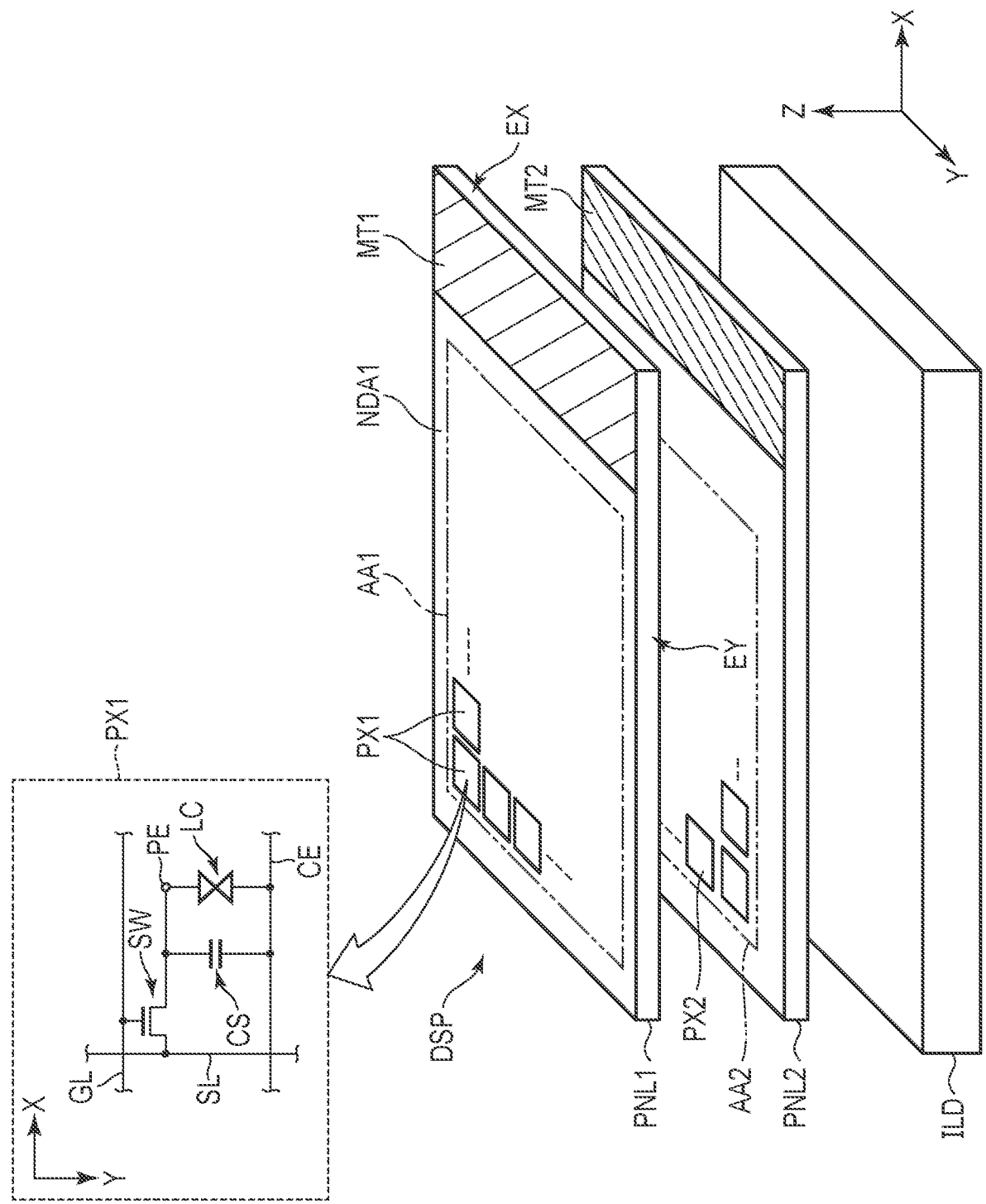
F I G. 1

DISPLAY DEVICE

CROSS-REFERENCE TO RELATED APPLICATIONS

This application is based upon and claims the benefit of priority from Japanese Patent Application No. 2022-063014 filed Apr. 5, 2022, the entire contents of which are incorporated herein by reference.

FIELD

Embodiments described herein relate generally to a display device.

BACKGROUND

In recent years, in order to improve the contrast of display devices, such technology has been developed to use a display panel for dimming in addition to a display panel for displaying images.

BRIEF DESCRIPTION OF THE DRAWINGS

FIG. 1 is an exploded perspective view schematically showing a configuration of a display device comprising two display panels.

DETAILED DESCRIPTION

Figure 2:
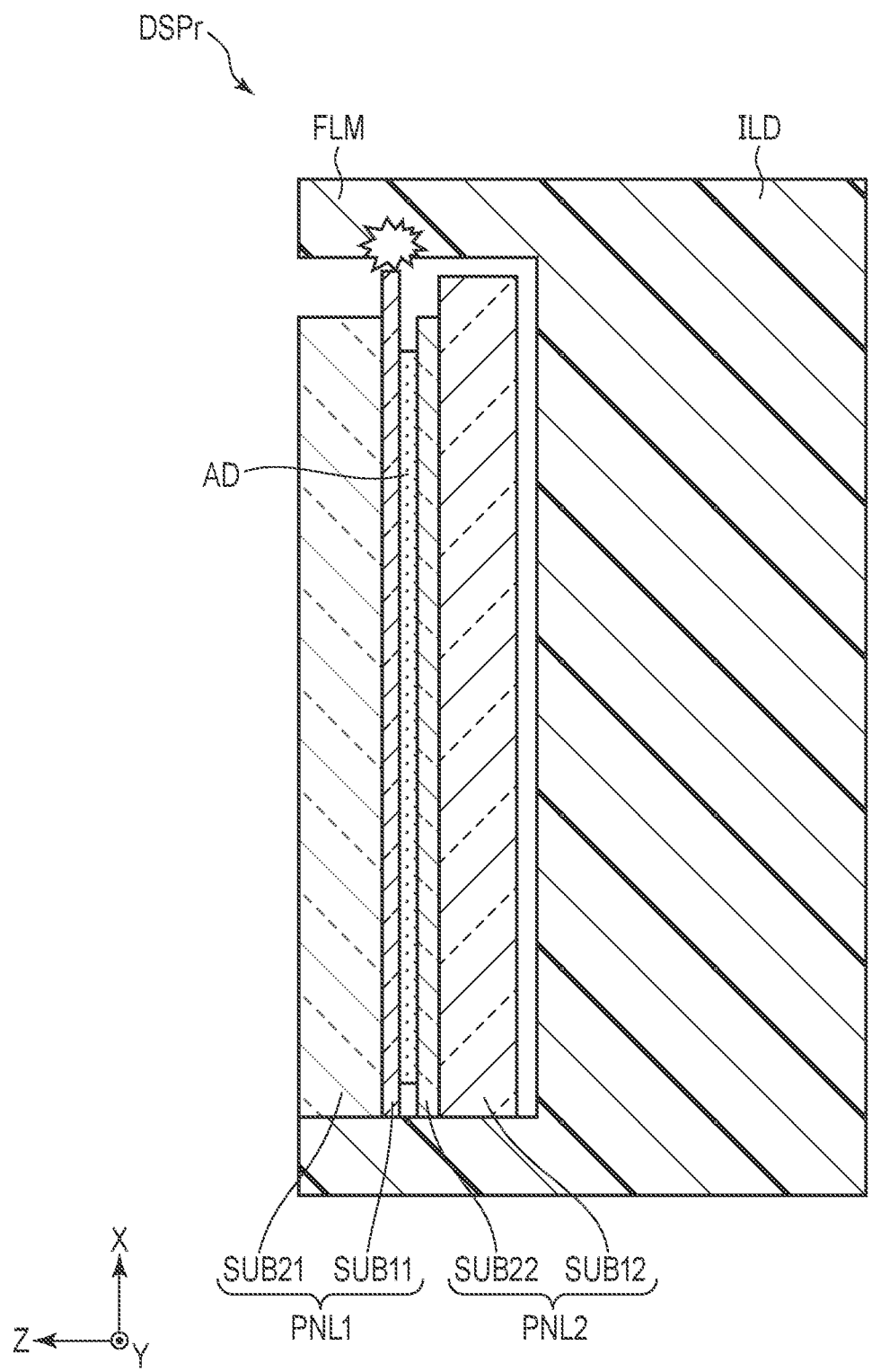
FIG. 2 is a cross-sectional view showing a display device of a comparative example.

In general, according to one embodiment, a display device comprises
a liquid crystal display panel comprising:
a first substrate having a first length along a first direction;
a second substrate opposing the first substrate and having a second length along the first direction; and
a first liquid crystal layer provided between the first substrate and the second substrate,
a dimming panel comprising:
a third substrate having a third length along the first direction;
a fourth substrate opposite the third substrate and having a fourth length along the first direction; and
a second liquid crystal layer provided between the third substrate and the fourth substrate,
an adhesive layer provided between the liquid crystal display panel and the dimming panel; and
an illumination device having a frame, wherein
the third length is greater than the first length, the second length and the fourth length,
the first length is greater than the second length,
the third thickness of the third substrate is greater than the first thickness of the first substrate, and
the second thickness of the second substrate is greater than the first thickness.

According to another embodiment, a display device comprising:
a liquid crystal display panel comprising:
a first substrate having a first length along the first direction;
a second substrate opposing the first substrate and having a second length along the first direction; and
a first liquid crystal layer provided between the first substrate and the second substrate,
a dimming panel comprising:
a third substrate having a third length along the first direction;
a fourth substrate opposing the third substrate and having a fourth length along the first direction; and
a second liquid crystal layer provided between the third substrate and the fourth substrate,
an adhesive layer provided between the liquid crystal display panel and the dimming panel; and
an illumination device including a frame, wherein
the third length is greater than the first length, the second length, and the fourth length,
the first length is greater than the second length,
the third thickness of the third substrate is greater than the first thickness of the first substrate, the second thickness of the second substrate and the fourth thickness of the fourth substrate, and
the first thickness, the second thickness and the fourth thickness is equal to each other.

According to still another embodiment, a display device comprising:
a liquid crystal display panel comprising:
a first substrate having a first length along the first direction;
a second substrate opposing the first substrate and having a second length along the first direction; and
a first liquid crystal layer provided between the first substrate and the second substrate,
a dimming panel comprising:
a third substrate having a third length along the first direction;
a fourth substrate opposing the third substrate and having a fourth length along the first direction; and
a second liquid crystal layer provided between the third substrate and the fourth substrate,
an adhesive layer provided between the liquid crystal display panel and the dimming panel; and
an illumination device including a frame, wherein
the third length is greater than the first length, the second length, and the fourth length,
the first length is greater than the second length,
the third thickness of the third substrate is greater than the first thickness of the first substrate, and
the second thickness of the second substrate is greater than the first thickness of the first substrate.

An object of the embodiments is to provide a display device which can prevent cracking from occurring in a substrate, thereby improving the yield.

Embodiments will be described hereinafter with reference to the accompanying drawings. Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

The embodiments described herein are not general ones, but rather embodiments that illustrate the same or corresponding special technical features of the invention. The following is a detailed description of one embodiment of a display device with reference to the drawings.

In this embodiment, a first direction X, a second direction Y and a third direction Z are orthogonal to each other, but may intersect at an angle other than 90 degrees. The direction toward the tip of the arrow in the third direction Z is defined as up or above, and the direction opposite to the direction toward the tip of the arrow in the third direction Z is defined as down or below. The first direction X, the second direction Y, and the third direction Z may as well be referred to as an X direction, a Y direction and a Z direction, respectively.

With such expressions as "the second member above the first member" and "the second member below the first member", the second member may be in contact with the first member or may be located away from the first member. In the latter case, a third member may be interposed between the first member and the second member. On the other hand, with such expressions as "the second member on the first member" and "the second member beneath the first member", the second member is in contact with the first member.

Further, it is assumed that there is an observation position to observe the display device on a tip side of the arrow in the third direction Z. Here, viewing from this observation position toward the X-Y plane defined by the first direction X and the second direction Y is referred to as plan view. Viewing a cross-section of the display device in the X-Z plane defined by the first direction X and the third direction Z or in the Y-Z plane defined by the second direction Y and the third direction Z is referred to as cross-sectional view.

Embodiment

FIG. 1 is an exploded perspective view schematically showing a configuration of a display device comprising two display panels. FIG. 1 shows a three-dimensional space defined by the first direction X, the second direction Y perpendicular to the first direction X and the third direction Z perpendicular to the first direction X and the second direction Y.

As shown in FIG. 1, the display device DSP comprises a liquid crystal display panel PNL1, a dimming panel PNL2, and an illumination device ILD. As shown in FIG. 1, with the dimming panel PNL2 disposed between the liquid crystal display panel PNL1 and the illumination device ILD, the contrast of images displayed on the liquid crystal display panel PNL1 can be improved.

The liquid crystal display panel PNL1 is, for example, rectangular. In the example illustrated, the liquid crystal display panel PNL1 includes a short side EX parallel to the first direction X, and a long side EY parallel to the second direction Y. The third direction Z corresponds to the thickness direction of the liquid crystal display panel PNL1. The main surface of the liquid crystal display panel PNL1 is parallel to the X-Y plane defined by the first direction X and the second direction Y. The liquid crystal display panel PNL1 has an effective area AA1 (display area) and a non-display area NDA1 located on an outer side the effective area AA1. The non-display area NDA1 includes a terminal region MT1 where a driver IC or a flexible wiring board are mounted. In FIG. 1, the terminal region MT1 is indicated by a shaded line.

The effective area AA1 is an area which displays images and comprises a plurality of pixels PX1 arranged in a matrix along the first direction X and the second direction Y, for example. As enlargedly shown in FIG. 1, each pixel PX1 is arranged in a region partitioned by scanning lines GL and signal lines SL, and comprises a switching element SW, a pixel electrode PE, a common electrode CE, a liquid crystal layer LC and the like.

The switching element SW is constituted by a thin-film transistor (TFT), for example, and is electrically connected to the respective scanning line GL and the respective signal line SL. The scanning line GL is electrically connected to the switching element SW in each of the pixels PX1 aligned along the first direction X. The signal line SL is electrically connected to the switching element SW in each of the pixels PX1 aligned along the second direction Y. The pixel electrode PE is electrically connected to the switching element SW. Each of the pixel electrodes PE opposes the common electrode CE, and the liquid crystal layer LC is driven by the electric field generated between each pixel electrode PE and the common electrode CE. The capacitance CS is formed, for example, between an electrode having the same potential as that of the common electrode CE and an electrode having the same potential as that of the pixel electrode PE.

The terminal region MT1 extends along the short side EX of the liquid crystal display panel PNL1. A terminal portion is formed in the terminal region MT1, and the liquid crystal display panel PNL1 is electrically connected to, for example, an external device such as a flexible wiring substrate, via the terminal portion.

The dimming panel PNL2 has basically the same configuration as that of the liquid crystal display panel PNL1. The dimming panel PNL2 includes a plurality of pixels PX2 provided in a matrix along the first direction X and the second direction Y in the effective area (a display area). The region where the plurality of pixels PX2 are provided is referred to as an effective area AA2. The effective area AA2 has the same size as that of the effective area AA1.

Each of the plurality of pixels PX2 corresponds to each respective one of the plurality of pixels PX1. Alternatively, a single pixel PX2 may correspond to three pixels PX1 corresponding to red (R), green (G) and blue (B). The configuration of the pixels PX2 is similar to that of the pixels PX1, and therefore a detailed description thereof will be omitted, but that provided above should be referred to. In this embodiment, the pixels PX1 and the pixels PX2 have the same configuration. The pixel PX1 and the pixels PX2 may be the same as or different from each other in size. More specifically, the pixels PX1 and the pixels PX2 have the same layer configuration. When the pixels PX1 and the pixels PX2 are the same as each other in size, the lengths thereof along each of the first direction X and the second direction Y are the same as each other, respectively.

The dimming panel PNL2, as in the case of the liquid crystal display panel PNL1, includes an effective area AA2 and a non-display area NDA2 located on an outer side of the effective area AA2. The non-display area NDA2 includes a terminal region MT2 on which a driver IC and a flexible wiring board are mounted. The non-display area NDA2 and terminal region MT2 are similar to the non-display area NDA1 and the terminal region MT1, respectively.

The illumination device ILD is located below the dimming panel PNL2, and images are displayed by controlling the light from the illumination device ILD for each pixel PX. The illumination device ILD of this embodiment is the so-called backlight.

FIG. 2 is a cross-sectional view showing a display device of a comparative example. The display device DSPr includes an illumination device ILD, a liquid crystal display panel PNL1 and a dimming panel PNL2.

FIG. 2 shows only a substrate SUB11 and a substrate SUB21 in the liquid crystal display panel PNL1. In the dimming panel PNL2, only a substrate SUB12 and a substrate SUB22 are shown. For the illumination device ILD, only a frame FLM is shown.

The liquid crystal display panel PNL1 includes a substrate SUB11, a substrate SUB21 and a liquid crystal layer (not shown) provided between the substrate SUB11 and the substrate SUB21. The switching elements SW, the pixel electrode PE, the signal lines SL, the scanning lines GL and the like described above are provided on the substrate SUB11.

The dimming panel PNL2 includes a substrate SUB12, a substrate SUB22, and a liquid crystal layer (not shown) provided between the substrate SUB12 and the substrate SUB22. The switching elements SW, the pixel electrodes PE, the signal lines SL, the scanning lines GL and the like described above are provided on the substrate SUB12.

The substrate SUB11, the substrate SUB21, the substrate SUB12 and the substrate SUB22 are each constituted by a plate-like base. The switching elements SW, etc., mentioned above are provided on the plate-shaped bases. For the bases, glass is used.

Between the substrate SUB11 and the substrate SUB22, an adhesive layer AD is provided. For example, an optical clear adhesive (OCA) can be used for the adhesive layer AD. The adhesive layer AD is overlaid on the entire effective area AA1 and the entire effective area AA2 described above. On the other hand, each of the effective area AA1 and the effective area AA2 does not overlap the entire adhesive layer AD. In other words, the adhesive layer AD is overlaid so as to cover each of the effective area AA1 and the effective area AA2.

The liquid crystal display panel PNL1 and the dimming panel PNL2 are accommodated in a recess of the frame FLM. The substrate SUB11 of the liquid crystal display panel PNL1 is provided with the terminal region MT1 described above. With this configuration, the length of the substrate SUB11 along the first direction X is greater than the length of the substrate SUB21 along the first direction X. The substrate SUB12 of the dimming panel PNL2 is provided with the terminal region MT2 described above. With this configuration, the length of the substrate SUB12 along the first direction X is greater than that of the substrate SUB22 along the first direction X.

The liquid crystal display panel PNL1 and the dimming panel PNL2 are adhered together by the adhesive layer AD. In FIG. 2, the adhesive layer AD is provided between the substrate SUB11 and the substrate SUB22. The length of the adhesive layer AD along the first direction X is less than the length of each of the substrate SUB11 and the substrate SUB22 along the first direction X. The configurations of the liquid crystal display panel PNL1 and the dimming panel PNL2 are similar to each other. Therefore, the lengths of substrate SUB11 and the substrate SUB12 along the first direction X are the same as each other. The lengths of substrate SUB21 and the substrate SUB22 along the first direction X are the same as each other.

The thicknesses of the substrates will now be described here. When two panels, the liquid crystal display panel PNL1 and the dimming panel PNL2, are stacked one on another, the phenomenon of a double displayed image occurs. As measure to such double images, the substrate SUB11 of the liquid crystal display panel PNL1 and the substrate SUB22 of the dimming panel PNL2 are polished before being adhered together, in order to reduce the thickness. Thus, although the occurrence of double images can be suppressed, the reduced thickness may undesirably cause a decrease in rigidity.

In particular, the substrate SUB11 is lengthy along the first direction X and thin. For example, if the substrate SUB11 hits the frame FLM of the illumination device ILD while transporting the display device DSPr, the substrate SUB11 may undesirably crack.

Figure 3:
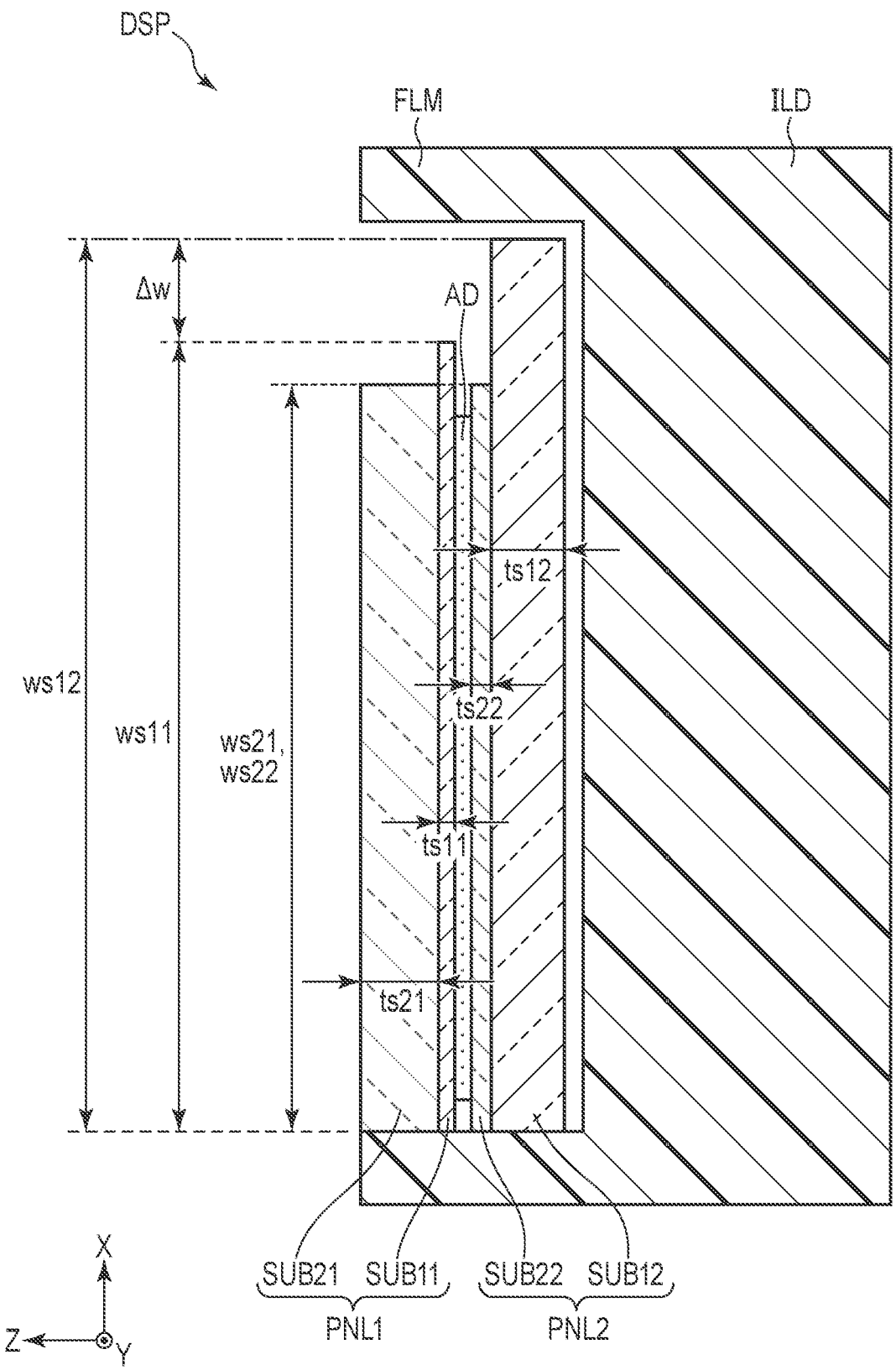
FIG. 3 is a cross-sectional view schematically showing a display device of an embodiment.

FIG. 3 is a cross-sectional view schematically showing an example of the display device of this embodiment. In the display device DSP, the length of the substrate SUB12, which is the lower substrate of the dimming panel PNL2, along the first direction X is greater than the length of the other substrate. The substrate SUB12 is free from the double image problem, and therefore is not polished and therefore thick. For this reason, even if the substrate SUB12 hits the frame of the illumination device ILD, the risk of cracking is lower because its thickness is thick. Thus, the yield of the display device DSP can be improved.

The lengths (widths) of the substrate SUB11, the substrate SUB21, the substrate SUB12 and the substrate SUB22 along the first direction X are referred to as a length ws11, a length ws21, a length ws12 and a length ws22, respectively. The lengths (thicknesses) of the substrate SUB11, the substrate SUB21, the substrate SUB12 and the substrate SUB22 along the third direction Z are referred to as a length ts11, a length ts21, a length ts12 and a length ts22, respectively.

The length ws21 is equal to the length ws22 (ws21=ws22). The length ws11 is greater than lengths ws21 and ws22 (ws11>ws21, ws22). As described above, the length ws12 is greater than the other lengths ws11, ws21 and ws22 (ws12>ws11, ws21, ws22). Thus, a relationship: ws12>ws11>ws21=ws22 (Relationship 1) is established.

As described above, the thicknesses ts11 and ts22 of the substrate SUB11 and the substrate SUB22, which oppose each other while interposing the adhesive layer AD, are less than the thicknesses ts21 and ts12 of the remaining substrate SUB21 and substrate SUB12 (ts11, ts22<ts21, ts12 (Relationship 2)) is established.

The substrate SUB12, which is thicker and longest, hits the frame FLM. However, the thinner substrates SUB11 and SUB22 have their respective lengths ws11 and ws22 less than the length ws12 of the substrate SUB12. With this configuration, the substrate SUB11 and the substrate SUB22 do not hit the frame FLM. Thus, it is possible to prevent the thin substrates SUB11 and SUB22 from cracking.

Here, the difference between the length ws12 of the substrate SUB12 and the length ws11 of the substrate SUB11 is defined as a difference Aw (Aw=ws12−ws11). The difference Aw should preferably be as large as possible. More specifically, the difference Aw should preferably be 0.4 mm or more.

Figure 4:
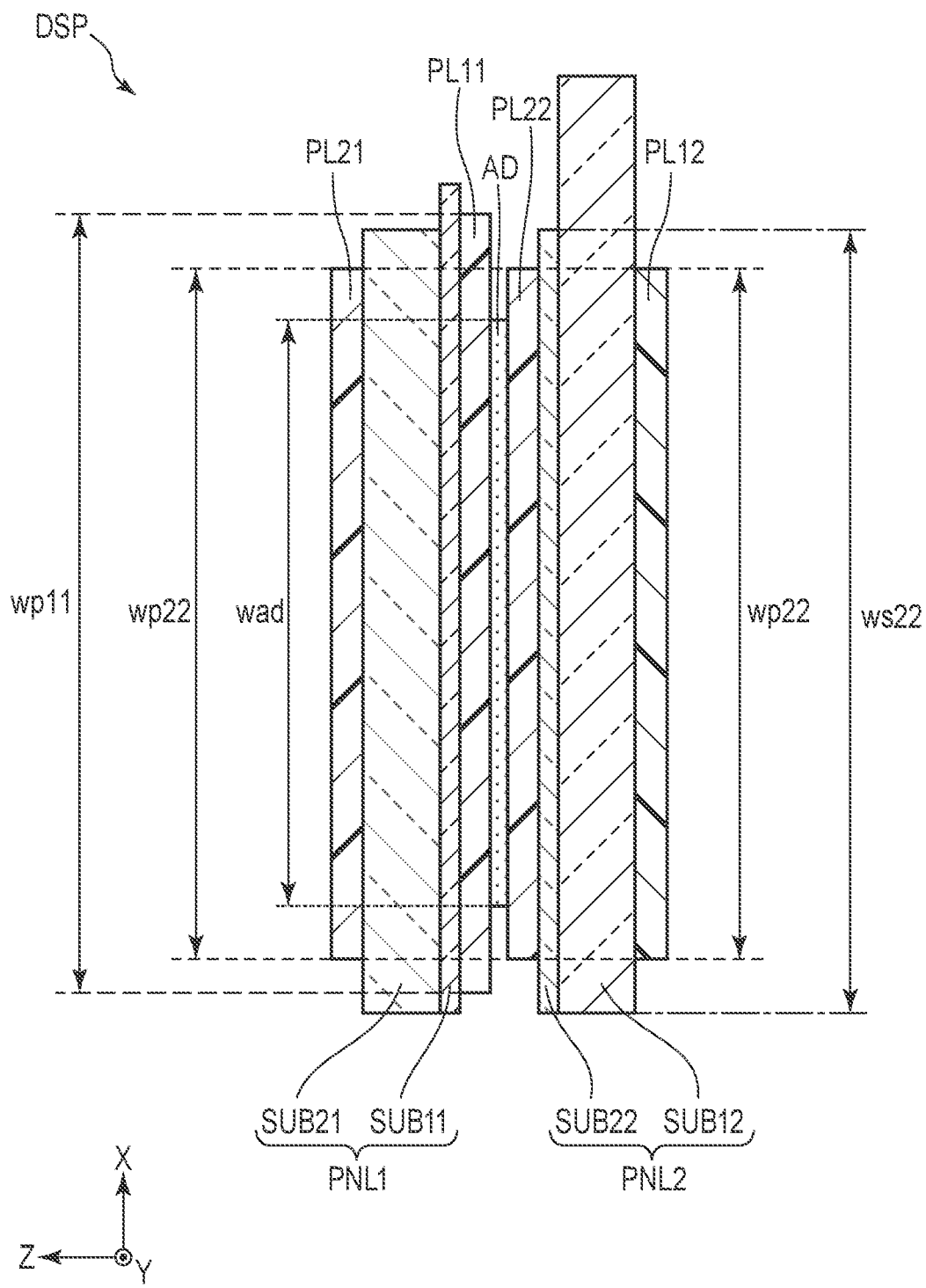
FIG. 4 is a cross-sectional view showing a liquid crystal display panel and a dimming panel.

The lengths of the polarizers of the liquid crystal display panel PNL1 and the dimming panel PNL2 will now be described here. FIG. 4 shows a cross-sectional view of the liquid crystal display panel and the dimming panel. In each of the liquid crystal display panel PNL1 and the dimming panel PNL2, a polarizer is provided in contact with the respective substrate.

In the liquid crystal display panel PNL1, a polarizer PL11 is attached to one of the surfaces of the substrate SUB11, which is on an opposite side to that opposing the substrate SUB21. The polarizer PL21 is attached to one of the surfaces of the substrate SUB21, which is on an opposite side to that opposing the substrate SUB11.

In the dimming panel PNL2, the polarizer PL12 is attached to one of the surfaces of the substrate SUB12, which is on an opposite side to that opposing the substrate SUB22. The polarizer PL22 is attached to one of the surfaces of the substrate SUB22, which is on an opposite side to that opposing the substrate SUB12.

As described above, the adhesive layer AD is provided between the substrate SUB11 and the substrate SUB22. More specifically, the adhesive layer AD is provided between the polarizer PL11 and the polarizer PL22. As the polarizer PL11 and the polarizer PL22 are adhered to each other by the adhesive layer AD, the liquid crystal display panel PNL1 and the dimming panel PNL2 are bonded together.

In the display device DSP, the length of the adhesive layer AD along the first direction X is defined as a length wad, the length of the polarizer PL11 of the liquid crystal display panel PNL1 along the first direction X is defined as a length wp11, and the length of the polarizer PL22 of the dimming panel PNL2 along the first direction X is defined as a length wp22.

The length wp22 of the polarizer PL22 of the dimming panel PNL2 is less than the length ws22 of the substrate SUB22 (wp22<ws22). The length wad of the adhesive layer AD is less than the length wp22 of the polarizer PL22 (wad<wp22). The length wp11 of the polarizer PL11 of the liquid crystal display panel PNL1 is greater than the length wad of the adhesive layer AD (wp11>wad). The length wp11 of the polarizer PL11 is greater than the length wp22 of the polarizer PL22 of the dimming panel PNL2 (wp11>wp22). In other words, relationships: wp22<ws22 and wad<wp11<wp22 (Relationship 3) are established.

Further, the length wp11 of the polarizer PL11 is greater than the length ws22 of the substrate SUB22 (wp11>ws22). Therefore, a relationship: wad<wp22<ws22<wp11 (Equation 4) is established.

Note that those other than the polarizer PL11, that is, polarizer PL22, PL12 and PL21 may have the same size.

The adhesive layer AD is overlaid on each of the entire effective area AA1 of the liquid crystal display panel PNL1 and the entire effective area AA2 of the dimming panel PNL2. On the other hand, each of the effective area AA1 and the effective area AA2 does not overlap the entire adhesive layer AD. In other words, the adhesive layer AD is overlaid to cover each of the effective area AA1 and the effective area AA2.

In the display device DSP having the above-described relationships between the lengths of the polarizers and the substrates, uneven bonding, which may occur when bonding the liquid crystal display panel PNL1 and the dimming panel PNL2 together, can be prevented. Thus, it is possible to obtain a display device DSP with high display quality.

In this embodiment, the thicker and longer substrates, which is brought into contact with the frame FLM of the illumination device ILD, can prevent cracks, which may occur in the thin substrates. Thus, the yield of the display device DSP can be improved.

Configuration Example 1

Figure 5:
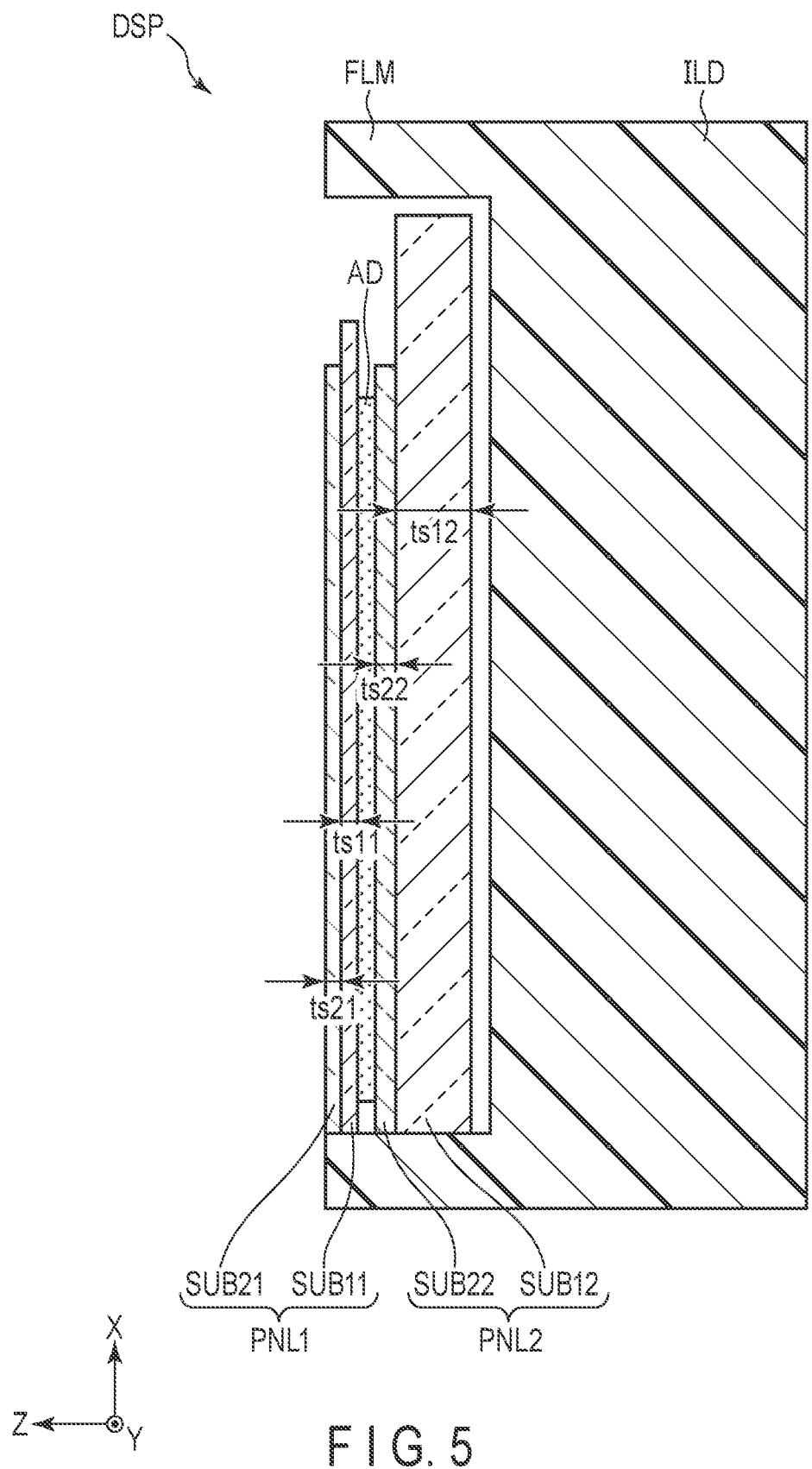
FIG. 5 is a cross-sectional view schematically showing a configuration example of the display device of the embodiment.

FIG. 5 is a cross-sectional view of another configuration example of the display device in the embodiment. The configuration example shown in FIG. 5 is different from that of FIG. 3 in that those substrates other than the long substrate are thinner than the long substrate.

The thickness ts21 of the substrate SUB21 shown in FIG. 5 is less than the thickness ts12 of the substrate SUB12. Further, the thickness ts21 of the substrate SUB21, the thickness ts11 of the substrate SUB11 and the thickness ts22 of the substrate SUB22 may be the same as each other (ts21=ts11=ts22). In other words, a relationship: ts12>ts21=ts11=ts22 (Relationship 5) is established.

If the thickness ts21 of the substrate SUB21 is decreased, it is possible to prevent uneven spacing between substrates that sandwich the liquid crystal layer in each of the liquid crystal display panel PNL1 and the dimming panel PNL2.

Here, let us consider the case where, when adhering the liquid crystal display panel PNL1 and the dimming panel PNL2 together by means of the adhesive layer AD, then, there is a process of pressing them together with a roller. If there are substrates with different thicknesses, the stress from the roller may not be propagated evenly.

If the stress is not propagated evenly, uneven spacing is created between the substrates that sandwich the liquid crystal layer. Between the substrates, a plurality of columnar insulators are provided to maintain the spacing. The columnar insulators are lowered in height (the length along the third direction Z) due to stress from the roller. When uneven stress is applied, the height of the columnar insulators becomes uneven according to the uneven stress.

However, if the three substrates of the display device DSP (the substrate SUB21, the substrate SUB11 and the substrate SUB12) have the same thickness, the stress from the roller is propagated more evenly. In the manner, the spacings become even between the respective substrates (that is, between the substrate SUB11 and the substrate SUB21, and between the substrate SUB12 and the substrate SUB22). Therefore, the display performance of the display device DSP is improved.

In this configuration example, advantageous effects similar to those of the embodiment can be obtained.

Configuration Example 2

Figure 6:
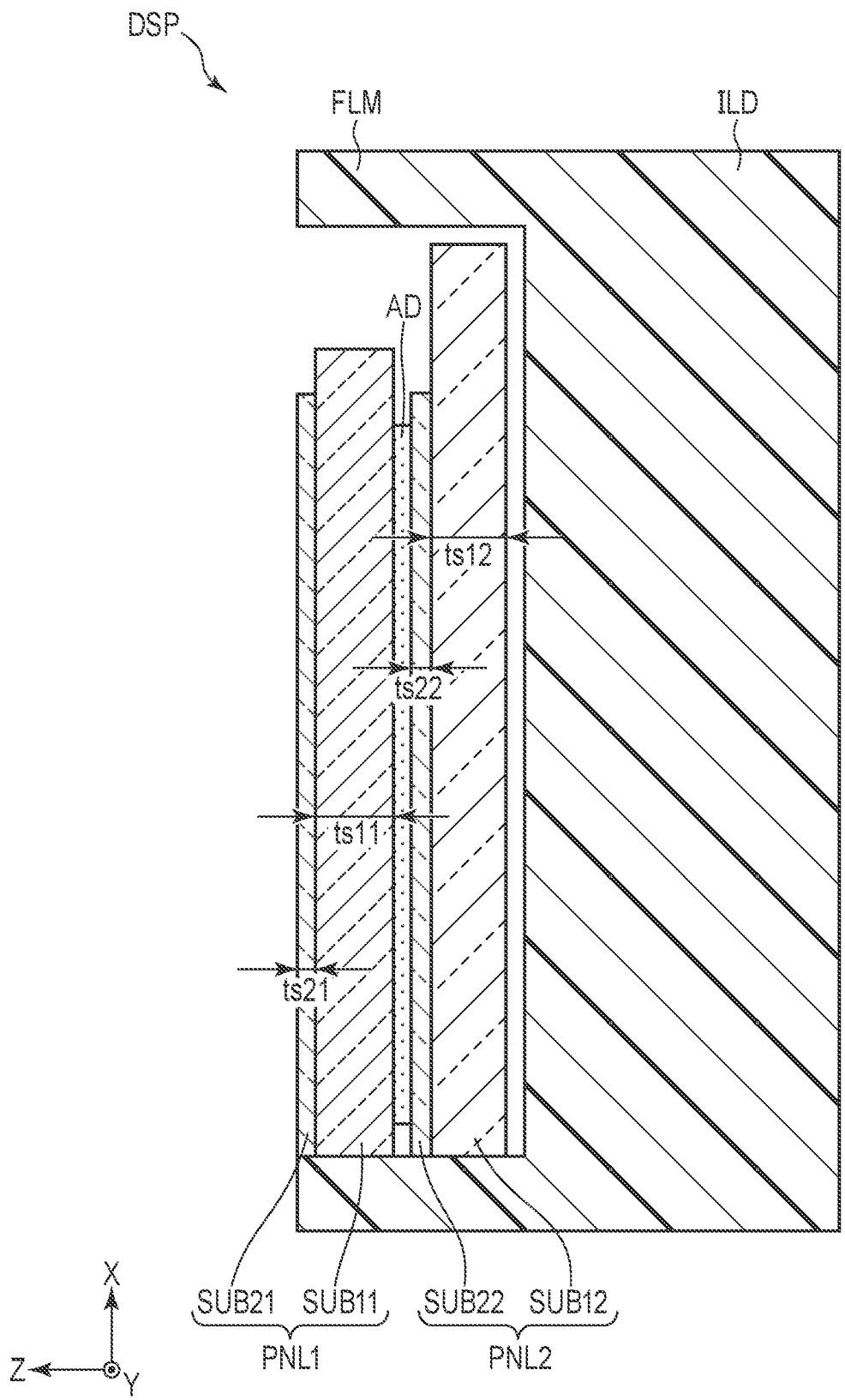
FIG. 6 is a cross-sectional view schematically showing a configuration example of the display device of the embodiment.

FIG. 6 is a cross-sectional view of another configuration example of the display device in the embodiment. The configuration example shown in FIG. 6 is different from that of FIG. 3 in that, among the liquid crystal display panel substrates, the substrate opposing the dimming panel is thicker than the other substrates.

In the display device DSP shown in FIG. 6, the length ws11, length ws21, length ws12 and length ws22 of the substrate SUB11, the substrate SUB21, the substrate SUB12 and the substrate SUB22, respectively are similar to those shown in FIG. 3.

However, in the respect that the thickness ts11 of the substrate SUB11 is greater than the thickness ts21 of the substrate SUB21 (ts11>ts21), it is different from FIG. 3.

In FIG. 6, the thickness ts12 of the substrate SUB12 is greater than the thickness ts22 of the substrate SUB22 (ts12>ts22). Therefore, a relationship: ts11, ts12>ts21, ts22 (Relationship 6) is established.

When the thicknesses ts11 and ts12 are equal to each other (ts11=ts12) and the thicknesses ts21 and ts22 are equal (ts21=ts22), then a relationship: ts11=ts12>ts21=ts22 (Relationship 7) is established. Note here that the thicknesses ts11 and ts12 may not necessarily be equal to or different from each other, and so may the thicknesses ts21 and ts22, respectively.

In this configuration example as well, advantageous effects similar to those of the embodiment can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a liquid crystal display panel comprising:
   a first substrate having a first length along a first direction;
   a second substrate opposing the first substrate and having a second length along the first direction; and
   a first liquid crystal layer provided between the first substrate and the second substrate,
a dimming panel comprising:
   a third substrate having a third length along the first direction;
   a fourth substrate opposite the third substrate and having a fourth length along the first direction; and
   a second liquid crystal layer provided between the third substrate and the fourth substrate,
an adhesive layer provided between the liquid crystal display panel and the dimming panel; and
an illumination device having a frame, wherein
the third length is greater than the first length, the second length and the fourth length,
the first length is greater than the second length,
the third thickness of the third substrate is greater than the first thickness of the first substrate, and
the second thickness of the second substrate is greater than the first thickness.

2. The display device according to claim 1, wherein
the liquid crystal display panel further comprises:
a first polarizer attached to a surface of the first substrate, which is on an opposite side to a surface opposing the second substrate;
a second polarizer attached to a surface of the second substrate, which is on an opposite side to a surface opposing the first substrate; and
a first effective area in which a plurality of first pixels are provided,
the dimming panel further comprises:
a third polarizer attached to a surface of the third substrate, which is on an opposite side to a surface opposing the fourth substrate;
a fourth polarizer attached to a surface of the fourth substrate, which is on an opposite side to a surface opposing the third substrate; and
a second effective area in which a plurality of second pixels are provided,
the adhesive layer is provided between the first polarizer and the fourth polarizer,
the adhesive layer overlaps the entire first effective area, and
a length of the adhesive layer along the first direction is less than a length of the first polarizer along the first direction.

3. The display device of claim 2, wherein
the length of the adhesive layer along the first direction is less than a length of the fourth polarizer along the first direction.

4. A display device comprising:
a liquid crystal display panel comprising:
   a first substrate having a first length along the first direction;
   a second substrate opposing the first substrate and having a second length along the first direction; and
   a first liquid crystal layer provided between the first substrate and the second substrate,
a dimming panel comprising:
   a third substrate having a third length along the first direction;
   a fourth substrate opposing the third substrate and having a fourth length along the first direction; and
   a second liquid crystal layer provided between the third substrate and the fourth substrate,
an adhesive layer provided between the liquid crystal display panel and the dimming panel; and
an illumination device including a frame, wherein
the third length is greater than the first length, the second length, and the fourth length,
the first length is greater than the second length,
the third thickness of the third substrate is greater than the first thickness of the first substrate, the second thickness of the second substrate and the fourth thickness of the fourth substrate, and
the first thickness, the second thickness and the fourth thickness is equal to each other.

5. The display device according to claim 4, wherein
the liquid crystal display panel further comprises:
a first polarizer attached to a surface of the first substrate, which is on an opposite side to a surface opposing the second substrate;
a second polarizer attached to a surface of the second substrate, which is on an opposite side to a surface opposing the first substrate; and
a first effective area in which a plurality of first pixels are provided,
the dimming panel further comprises:
a third polarizer attached to a surface of the third substrate, which is on an opposite side to a surface opposing the fourth substrate;
a fourth polarizer attached to a surface of the fourth substrate, which is on an opposite side to a surface opposing the third substrate; and
a second effective area in which a plurality of second pixels are provided,
the adhesive layer is provided between the first polarizer and the fourth polarizer,
the adhesive layer overlaps the entire first effective area, and
a length of the adhesive layer along the first direction is less than a length of the first polarizer along the first direction.

6. The display device of claim 5, wherein
the length of the adhesive layer along the first direction is less than a length of the fourth polarizer along the first direction.

7. A display device comprising:
a liquid crystal display panel comprising:
   a first substrate having a first length along the first direction;
   a second substrate opposing the first substrate and having a second length along the first direction; and a first liquid crystal layer provided between the first substrate and the second substrate, a dimming panel comprising:

a third substrate having a third length along the first direction;

a fourth substrate opposing the third substrate and having a fourth length along the first direction; and a second liquid crystal layer provided between the third substrate and the fourth substrate, an adhesive layer provided between the liquid crystal display panel and the dimming panel; and an illumination device including a frame, wherein the third length is greater than the first length, the second length, and the fourth length, the first length is greater than the second length, the third thickness of the third substrate is greater than the first thickness of the first substrate, and the second thickness of the second substrate is greater than the first thickness of the first substrate.

8. The display device according to claim 7, wherein the liquid crystal display panel further comprises:

a first polarizer attached to a surface of the first substrate, which is on an opposite side to a surface opposing the second substrate;

a second polarizer attached to a surface of the second substrate, which is on an opposite side to a surface opposing the first substrate; and a first effective area in which a plurality of first pixels are provided, the dimming panel further comprises:

a third polarizer attached to a surface of the third substrate, which is on an opposite side to a surface opposing the fourth substrate;

a fourth polarizer attached to a surface of the fourth substrate, which is on an opposite side to a surface opposing the third substrate; and a second effective area in which a plurality of second pixels are provided, the adhesive layer is provided between the first polarizer and the fourth polarizer, the adhesive layer overlaps the entire first effective area, and a length of the adhesive layer along the first direction is less than a length of the first polarizer along the first direction.

9. The display device of claim 8, wherein the length of the adhesive layer along the first direction is less than a length of the fourth polarizer along the first direction.

* * * * *